United States Patent
Tanizawa et al.

(10) Patent No.: US 10,212,436 B2
(45) Date of Patent: Feb. 19, 2019

(54) IMAGE ENCODING APPARATUS, IMAGE DECODING APPARATUS AND IMAGE TRANSMISSION METHOD

(71) Applicant: KABUSHIKI KAISHA TOSHIBA, Minato-ku (JP)

(72) Inventors: Akiyuki Tanizawa, Kawasaki (JP); Takeshi Chujoh, Kawasaki (JP); Tomoya Kodama, Kawasaki (JP); Shunichi Gondo, Tokyo (JP); Hiroyuki Kobayashi, Tsukubamirai (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 322 days.

(21) Appl. No.: 14/877,370

(22) Filed: Oct. 7, 2015

(65) Prior Publication Data

US 2016/0142715 A1 May 19, 2016

(30) Foreign Application Priority Data

Nov. 17, 2014 (JP) ................................. 2014-232702

(51) Int. Cl.
  *H04N 19/23* (2014.01)
  *H04N 19/46* (2014.01)
  *H04N 19/142* (2014.01)

(52) U.S. Cl.
  CPC ............. *H04N 19/23* (2014.11); *H04N 19/46* (2014.11)

(58) Field of Classification Search
  CPC ................................. H04N 19/23; H04N 19/46
  See application file for complete search history.

(56) References Cited

U.S. PATENT DOCUMENTS

| 4,951,140 A * | 8/1990 | Ueno ................... H04N 19/503 348/413.1 |
| 6,381,275 B1 * | 4/2002 | Fukuhara ............... H04N 19/00 375/240.06 |

(Continued)

FOREIGN PATENT DOCUMENTS

| JP | 10-23423 A | 1/1998 |
| JP | 2006-115283 | 4/2006 |

(Continued)

OTHER PUBLICATIONS

Atsuro Ichigaya, "Description of Video Coding Technology Proposal by NHK and Mitsubishi", Joint Collaborative Team on Video Coding (JCT-VC) of ITU-T SG16 WP3 and ISO/IEC JTC1/SC29/WG11, 1st Meeting: Dresden, DE Apr. 15-23, 2010, pp. 2-6.

*Primary Examiner* — Md N Haque
(74) *Attorney, Agent, or Firm* — Oblon, McClelland, Maier & Neustadt, L.L.P.

(57) ABSTRACT

According to an embodiment, an image encoding apparatus includes a background control information generator, a background image generator, and an image encoder. The background control information generator generates background control information based on an input image. The background control information is used for generating a first background image from at least one first image. The background image generator generates the first background image, based on the background control information and at least one first image. The image encoder encodes the input image using the first background image to generate encoded data.

8 Claims, 6 Drawing Sheets

(56) References Cited

U.S. PATENT DOCUMENTS

| | | | |
|---|---|---|---|
| 6,714,591 B1* | 3/2004 | Katata | G06T 9/20 |
| | | | 348/399.1 |
| 2003/0012277 A1* | 1/2003 | Azuma | G06T 7/70 |
| | | | 375/240.08 |
| 2010/0119156 A1 | 5/2010 | Noguchi et al. | |
| 2011/0075736 A1* | 3/2011 | Endo | H04N 5/144 |
| | | | 375/240.16 |
| 2012/0169923 A1* | 7/2012 | Millar | H04N 19/23 |
| | | | 348/399.1 |
| 2014/0118544 A1 | 5/2014 | Asaka et al. | |
| 2015/0078436 A1 | 3/2015 | Chujoh et al. | |

FOREIGN PATENT DOCUMENTS

| | | |
|---|---|---|
| JP | 2009-049979 | 3/2009 |
| JP | 2013-193427 | 9/2013 |
| JP | 2014-092875 | 5/2014 |
| JP | 2015-061197 | 3/2015 |
| WO | WO 2011/674189 A1 | 6/2011 |

* cited by examiner

IMAGE ENCODING APPARATUS, IMAGE DECODING APPARATUS AND IMAGE TRANSMISSION METHOD

CROSS-REFERENCE TO RELATED APPLICATIONS

This application is based upon and claims the benefit of priority from Japanese Patent Application No. 2014-232702, filed Nov. 17, 2014, the entire contents of which are incorporated herein by reference.

FIELD

Embodiments described herein relate generally to image transmission.

BACKGROUND

In general, where images (video) photographed by a camera are transmitted to a remote plate, the images are encoded (compressed) to reduce the amount of data transmitted. Typically, a high coding rate is enabled in image encoding by referring to previously encoded images and predicting a present image. If the images are transmitted by way of a narrow-band channel, however, the high image qualities are hard to maintain.

DETAILED DESCRIPTION

A description will now be given of the embodiments with reference to the accompanying drawings.

According to an embodiment, an image encoding apparatus includes a background control information generator, a background image generator, and an image encoder. The background control information generator generates background control information based on an input image. The background control information is used for generating a first background image from at least one first image. The background image generator generates the first background image, based on the background control information and at least one first image. The image encoder encodes the input image using the first background image to generate encoded data.

According to an image decoding apparatus includes a background control information generator, a background image generator and an image decoder. The background control information generator generates background control information based on a previously decoded image. The background control information is used for generating a background image from at least one image. The background image generator generates the background image, based on the background control information and at least one image. The image decoder decodes encoded data using the background image to generate a reproduced image.

In the descriptions below, the same reference numerals or symbols will be used to refer to already-described elements or elements similar to them, and redundant descriptions will be omitted.

(First Embodiment)

Figure 1:
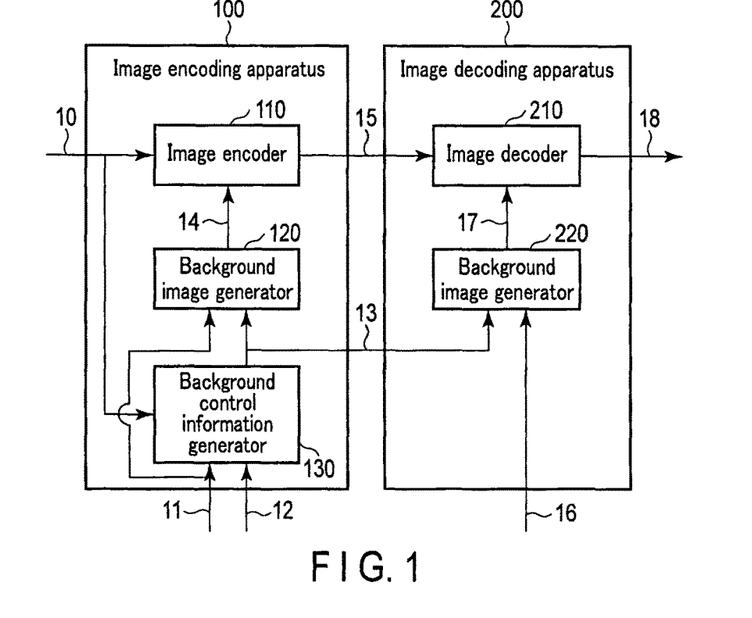
FIG. 1 is a block diagram illustrating an image transmission system according to the first embodiment.

As shown in FIG. 1, the image transmission system of the first embodiment comprises an image encoding apparatus 100 and an image decoding apparatus 200. The image encoding apparatus 100 includes an image encoder 110, a background image generator 120 and a background control information generator 130. The image decoding apparatus 200 includes an image decoder 210 and a background image generator 220. The image transmission system shown in FIG. 1 may be, for example, a system that transmits images photographed by a monitor camera to a remote operator terminal.

The image encoder 110 receives an input image (signal) 10, and also receives a background image (signal) 14, to be mentioned later, from a background image generator 120. The image encoder 110 encodes the input image 10 using the background image 14, thereby generating encoded data 15. The image encoder 110 transmits the encoded data 15 to the image decoding apparatus 200. The encoded data 15 may be transmitted to the image decoding apparatus 200 by wireless communications or supplied thereto by wire communications; alternatively, the encoded data 13 may be transferred to the image decoding apparatus 200, using a recording medium.

The encoded data 15 can have a high coding rate by performing predictive encoding using the background image 14. For example, if the background image 14 is used as a predictive image, most of the background region included in the input image 10 does not have to be encoded or transmitted. As a result, the amount of encoded data 15 can be significantly reduced.

Figure 4:
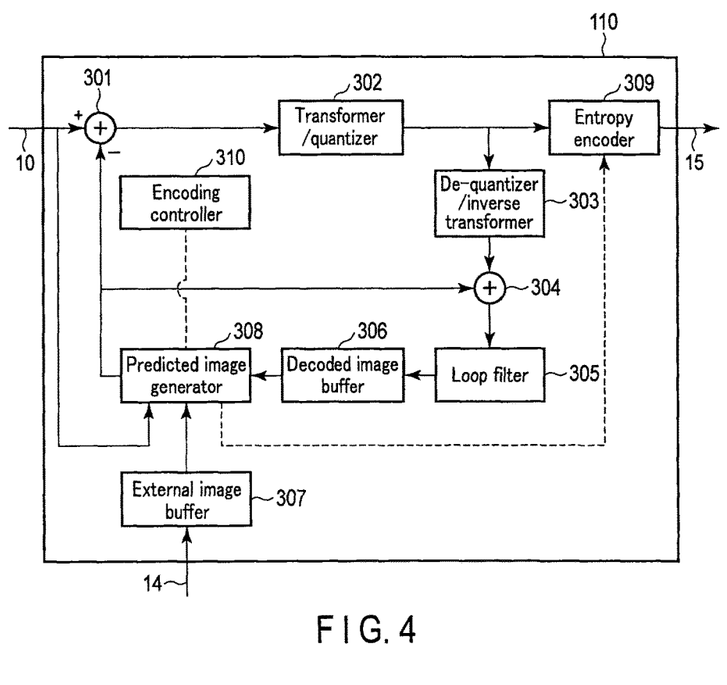
FIG. 4 is a block diagram illustrating an image encoder depicted in FIG. 1.

FIG. 4 shows a specific example of the image encoder 110. The image encoder 110 shown in FIG. 4 includes a subtractor 301, a transformer/quantizer 302, a de-quantizer/inverse transformer 303, an adder 304, a loop filter 305, a decoded image buffer 306, an external image buffer 307, a predicted image generator 308, an entropy encoder 309 and an encoding controller 310.

The subtractor 301 receives an input image 10, and also receives a predicted image from the predicted image generator 308. The subtractor 301 generates a prediction error (signal) by subtracting the predicted image from the input image 10. The subtractor 301 supplies the prediction error to the transformer/quantizer 302.

The transformer/quantizer 302 generates transform coefficients by transforming the prediction error, and generates quantized transform coefficients by quantizing the transform coefficients in accordance with a preset quantization parameter. Orthogonal transforms, such as a discrete cosine transform (DCT), are used for the transforming the prediction error. The transformer/quantizer 302 supplies the quantized transform coefficients to the de-quantizer/inverse transformer 303 and the entropy encoder 309.

The de-quantizer/inverse transformer 303 receives the quantized transform coefficients from the transformer/quantizer 302. The de-quantizer/inverse transformer 303 de-quantizes the quantized transform coefficients in accordance with the quantization parameter mentioned above, thereby restoring the transform coefficients to the original state, and performs inverse transform with respect to the transform coefficients (the inverse transform is processing just the opposite to the transform performed by the transformer/quantizer 302), thereby restoring the prediction error to the original state. Inverse orthogonal transforms, such as an inverse DCT (IDCT), are used for the inverse transforms of the transform coefficients. The de-quantizer/inverse transformer 303 supplies the prediction error to the adder 303.

The adder 304 receives the prediction error from the de-quantizer/inverse transformer 303, and the predicted image from the predicted image generator 308. The adder 304 adds the prediction error and the predicted image together, thereby generating a local decoded image (signal). The adder 304 supplies the local decoded image to the loop filter 305.

The loop filter 305 receives the local decoded image from the adder 304. The loop filter 305 applies loop filter processing to the local decoded image. For example, the loop filter processing may be deblocking filter processing. The loop filter 305 supplies the filtered local decoded image to the decoded image buffer 306.

The decoded image buffer 306 receives the filtered local decoded image from the loop filter 305. The decoded image buffer 306 stores the filtered local decoded image as a reference image. The decoded image buffer 306 supplies the reference images to the predicted image generator 308, as needed.

The external image buffer 307 receives the background image 14 from the background image generator 120. The external image buffer 307 stores the background image 14 as a reference image. The external image buffer 307 supplies the reference images to the predicted image generator 308, as needed.

The predicted image generator 308 acquires the input image, receives the reference image (filtered local decoded image) from the decoded image buffer 306, receives the reference image (background image 14) from the external image buffer 307, and receives prediction control information from the encoding controller 310. The predicted image generator 308 generates a predicted image, using both the input image 10 and the reference images and in accordance with the prediction control information. For example, the predicted image generator 308 generates a predicted image by performing intra prediction, motion compensation prediction for the reference images, or prediction from the background image 14 (corresponding to the inter-layer prediction in hierarchical coding). The predicted image generator 308 supplies the predicted image to both the subtractor 301 and the adder 304. In addition, the predicted image generator 308 supplies prediction information regarding the predicted image (including motion vector information) to the entropy encoder 309.

The entropy encoder 309 receives the quantized transform coefficients from transformer/quantizer 302, and the prediction information from the predicted image generator 308. The entropy encoder 309 performs entropy encoding for both the quantized transform coefficients and the prediction information in accordance with the syntax, thereby generating encoded data 15. The entropy encoder 309 supplies the encoded data 15 to an apparatus external to the image encoder 110. The entropy encoding is, for example, Huffman encoding, arithmetic encoding, or the like. The encoding controller 310 generates prediction control information and supplies this information to the predicted image generator 308.

The background image generator 120 receives a fundamental image (signal) 11, and also receives background control information 13 from the background control information generator 130. The background image generator 120 generates a background image 14 based on the fundamental image 11 and the background control information 13. The background image generator 120 supplies the background image 14 to the image encoder 110.

To be specific, the fundamental image 11 may comprise one or more still images; alternatively, it may comprise a moving picture including a plurality of image frames. To enhance the coding rate, it is preferable that the fundamental image 11 include images which are likely to resemble the input image in terms of the photographing position, the photographing direction, etc. For example, if the input image 10 is an image which is photographed by a camera attached to a first moving object (e.g., a train and a bus) when this first moving object travels along a predetermined route, then the fundamental image 11 may be a past image which is photographed by a camera attached to a second moving object (which may be the same as, or different from the first moving object) when the second moving object travels along the same route. Alternatively, the fundamental image 11 may be an image photographed in the past by a fixed camera or an externally controllable camera that photographs the input image 10.

The background control information 13 includes a parameter required for generating the background image 14. To be specific, the background control information 13 may include selection information representing at least one image (selection image) that is selected as the base of the background image 14 of the fundamental image 11. The selection information may be a frame number if the fundamental image 11 is a moving picture. The background control information 13 includes a correction parameter used for enhancing the quality of the background image 14.

For example, the background image generator 120 may generate the background image 14 by selecting one image (selection image) from at least one fundamental image 11 based on the background control information 13. Alternatively, the background image generator 120 may generate the background image 14 by selecting a plurality of images (selection images) from a plurality of fundamental images 11 based on the background control information 13 and executing background pixel calculation (to be described later), using the selection images. In addition, the background image generator 120 may execute format conversion or image correction for the background image 14 generated as above, before the background image 14 is supplied to the image encoder 110.

If the background image 14 differs from the input image 10 in format, then the background image generator 120 converts the format of the background image 14 to the same format as the input image 10. The format is, for example, an image size, an image bit depth, a color difference format, a color space, etc.

Where the background control information 13 includes a correction parameter, the background image generator 120 corrects the background image 14 using the correction parameter. To be more specific, the background image generator 120 may execute gamma correction, using the gamma value included in the correction parameter. The background image generator 120 may execute histogram conversion, using the histogram information on the input image included in the correction parameter. The background image generator 120 may execute Wiener filter processing for the background image 14, using the filter coefficient of the Wiener filter included in the correction parameter (the filter coefficient can be determined based on the input image 10 and the background image 14). The background image generator 120 may execute weighted prediction of the background image 14, for example, for the correction of the brightness, using the weight coefficient and offset value included in the correction parameter. The background image generator 120 may execute geometric transform of the background image 14, for example, for the correction of the photographing position, using the geometric-transform parameter value included in the correction parameter. The background image generator 120 may execute a variety of image corrections not mentioned herein.

Figure 2:
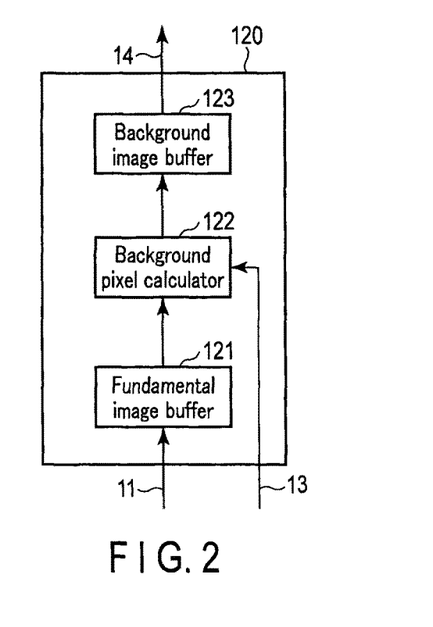
FIG. 2 is a block diagram illustrating a background image generator depicted in FIG. 1.

FIG. 2 shows a specific example of the background image generator 120. The background image generator 120 shown in FIG. 2 includes a fundamental image buffer 121, a background pixel calculator 122 and a background image buffer 123.

The fundamental image buffer 121 receives and stores a fundamental image 11. The fundamental image 11 stored in the fundamental image buffer 121 is read out by the background pixel calculator 122, as needed.

The background pixel calculator 122 receives background control information 13 from the background control information generator 130. The background pixel calculator 122 specifies a plurality of selection images based on the background control information 13 and reads the selection images from the fundamental image buffer 121. The background pixel calculator 122 generates a background image 14 (pixel values constituting the background image) by executing background pixel calculation using the selection images read out from the fundamental image buffer 121. The background pixel calculator 122 supplies the background image 14 to the background image buffer 123.

The background pixel calculation may be any kind of arithmetic processing for deriving background pixels from a plurality of images (selection images) that are adjusted in position and photographed at different photographing times. For example, the background pixel calculator 122 may calculate a mode of the pixel values at predetermined positions of the selection images, thereby deriving the pixel values of the predetermined position of the background image 14. The background pixel calculator 122 may calculate a median or an average in place of the mode. The background pixel calculator 122 may determine a threshold used for determining non-background pixels (foreground pixels), based on the average and variance of the pixel values at predetermined positions of a plurality of selection images. In this case, the background pixel calculator 122 first excludes non-background pixels from the pixel values, and re-calculates an average to derive the pixel values at the predetermined position of the background image 14. Alternatively, the background pixel calculator 122 may calculate each of the pixel values of the background image 14, using the Gaussian mixture model (GMM) or the Godbehere, Matsukawa, Goldberg algorithm (GMG algorithm).

A general image transmission system uses a color space in which a pixel value is expressed based on one brightness signal and two color-difference signals. However, the brightness signal is easily affected by a shadow in the background pixel calculation. If the color space of a selection image includes a brightness signal, therefore, the background pixel calculator 122 may first convert the color space into a color space including no brightness signal (e.g., RGB) and then execute background pixel calculation. Furthermore, the background pixel calculator 122 may change each pixel value of the background image 14 back into an original color space, as needed.

The background image buffer 123 receives the background image 14 (the pixels values constituting the background image) from the background pixel calculator 122, and stores the received background image 14. The background image 14 stored in the background image buffer 123 is read out by the image encoder 110, as needed.

The background control information generator 130 receives an input image 10, a fundamental image 11 and supplemental information 12. The background control information generator 130 searches the fundamental image 11 for an image similar to the input image, based for example on the supplemental information 12, and generates background control information 13 including selection information representing the image searched for (which image is the same as the selection image described above). Furthermore, the background control information generator 130 may generate a correction parameter used for correcting the background image 14 and include it in the background control information 13.

The supplemental information 12 may include information representing, for example, a photographing position, a photographing direction, a photographing date, a photographing time, etc. These kinds of information are useful when the background control information generator 130 searches the fundamental image 11 for an image similar to the input image 10. For example, the information on the photographing position and photographing direction is useful when the fundamental image 11 is searched for an image which is similar to the input image in terms of an object (especially, a background) to be photographed. The information on the photographing date and time is useful when the fundamental image 11 is searched for an image which is similar to the input image 10 in terms of the sunshine condition.

The background control information generator 130 may search the fundamental image 11 for an image similar to the input image, without using the supplemental information 12. Alternatively, the background control information generator 130 may select at least one image from the fundamental image 11, without reference to the input image 10. In order to improve the coding rate, an image similar to the input image 10 should be preferably searched for. In order to improve the search efficiency, the supplemental information 12 should be preferably used.

The background control information generator 130 supplies the background control information 13 to the background image generator 120. In addition, the background control information generator 130 supplies the background control information 13 to the image decoding apparatus 200.

The background control information 13 may be transmitted to the image decoding apparatus 200 by wireless communications or supplied thereto by wire communications; alternatively, the background control information 13 may be transferred to the image decoding apparatus 200, using a recording medium.

The background control information 13 may be transmitted separately from the encoded data 15 or together with the encoded data 15. For example, the background control information 13 and the encoded data 15 are transmitted after being multiplexed or packetized. For the transmission of the background control information 13, a framework of the supplemental enhancement information (SEI) in H.264/AVC or H.265/HEVC may be used.

Figure 3:
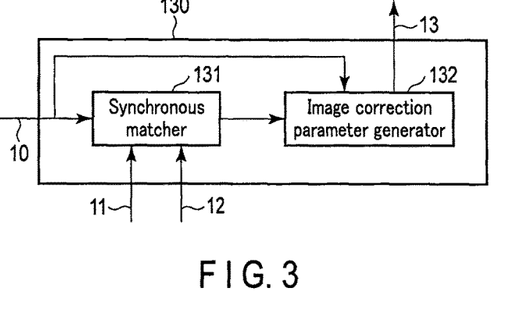
FIG. 3 is a block diagram illustrating a background control information generator depicted in FIG. 1.

FIG. 3 shows a specific example of the background control information generator 130. The background control information generator 130 shown in FIG. 3 includes a synchronous matcher 131 and an image correction parameter generator 132.

The synchronous matcher 131 receives an input image 10, a fundamental image 11 and supplemental information 12. The synchronous matcher 131 searches the fundamental image 11 for an image similar to the input image 10, based on the supplemental information 12, and generates selection information representing at least one image searched for (which image is the same as the selection image described above). The selection image may include, for example, an image which is included in the fundamental image 11 and which most resembles the input image 10. The synchronous matcher 131 supplies the selection information and the selection image to the image correction parameter generator 132.

The image correction parameter generator 132 receives the input image 10, and also receives the selection information and selection image from the synchronous matcher 131. The image correction parameter generator 132 generates the correction parameter described above, based on the input image 10 and the selection image. The image correction parameter generator 132 generates background control information 13, including selection information and a correction parameter, and supplies the generated background control information 13 to the background image generator 120. In addition, the image correction parameter generator 132 supplies the background control information 13 to the image decoding apparatus 200.

The image encoder 210 receives encoded data 15 transmitted from the image encoding apparatus 100, and also receives a background image (signal) 17, to be mentioned later, from the background image generator 220. The image decoder 210 decodes the encoded data 15, using the background image 17, thereby generating a reproduced image (signal) 18. The background image 17 is the same as (common to) the background image 14 generated by the image encoding apparatus 100. The reproduced image 18 is substantially the same as the input image. The image decoder 210 supplies the reproduced image 18 to an external apparatus (e.g., a display not shown).

Figure 5:
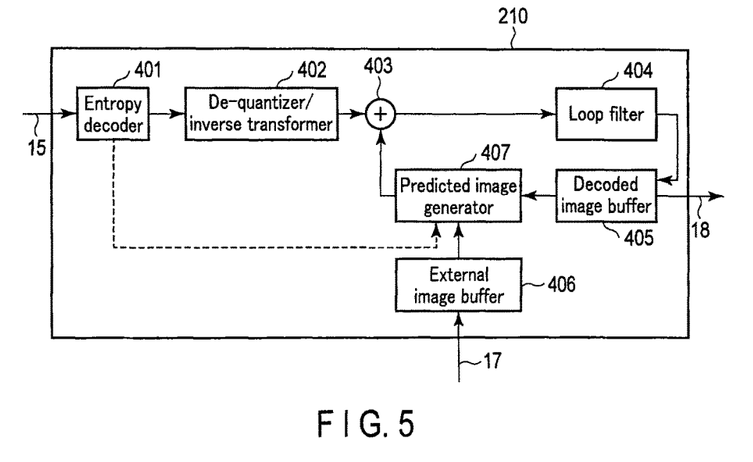
FIG. 5 is a block diagram illustrating an image decoder depicted in FIG. 1.

FIG. 5 shows a specific example of the image decoder 210. The image decoder 210 shown in FIG. 5 includes an entropy decoder 401, a de-quantizer/inverse transformer 402, an adder 403, a loop filter 404, a decoded image buffer 405, an external image buffer 406, and a predicted image generator 407.

The entropy decoder 401 receives encoded data 15 transmitted from the image encoding apparatus 100. The entropy decoder 401 executes entropy decoding for the encoded data 15, thereby obtaining the original quantized transform coefficients and prediction information (including motion vector information, for example). The entropy decoder 401 supplies the quantized transform coefficients to the de-quantizer/inverse transformer 402 and the prediction information to the predicted image generator 407.

The de-quantizer/inverse transformer 402 receives the quantized transform coefficients from the entropy decoder 401. The de-quantizer/inverse transformer 402 de-quantizes the quantized transform coefficients in accordance with the quantization parameter mentioned above, thereby restoring the transform coefficients, and performs inverse transform with respect to the transform coefficients (the inverse transform is processing just the opposite to the transform performed by the image encoder 110), thereby restoring the prediction error (signal). Inverse orthogonal transforms, such as an IDCT, are used for the inverse transforms of the transform coefficients. The de-quantizer/inverse transformer 402 supplies the prediction error to the adder 403.

The adder 403 receives the prediction error from the de-quantizer/inverse transformer 402, and the predicted image (signal) from the predicted image generator 407. The adder 403 adds the prediction error and the predicted image together, thereby generating a decoded image (signal). The adder 403 supplies the decoded image to the loop filter 404.

The loop filter 404 receives the decoded image from the adder 403. The loop filter 404 applies loop filter processing to the decoded image. For example, the loop filter processing may be deblocking filter processing. The loop filter 404 supplies the filtered decoded image to the decoded image buffer 405.

The decoded image buffer 405 receives the filtered decoded image from the loop filter 404. The decoded image buffer 405 stores the filtered decoded image as a reference image. The decoded image buffer 405 supplies the reference images to the predicted image generator 407, as needed. The decoded image buffer 405 supplies the reference image 18 to an external apparatus (e.g., a display not shown) as a reproduced image 18 in display order.

The external image buffer 406 receives the background image 17 from the background image generator 220. The external image buffer 406 stores the background image 17 as a reference image. The external image buffer 406 supplies the reference images to the predicted image generator 407, as needed.

The predicted image generator 407 receives the reference images (filtered decoded images) from the decoded image buffer 405, receives the reference image (background image 17) from the external image buffer 406, and receives prediction information from the entropy decoder 401. The predicted image generator 407 generates a predicted image, using both the prediction information and the reference images. For example, the predicted image generator 407 generates a predicted image by performing intra prediction, motion compensation prediction for the reference images, or prediction from the background image 17 (corresponding to the inter-layer prediction in hierarchical coding). The predicted image generator 407 supplies the predicted image to the adder 403.

The background image generator 220 receives a fundamental image (signal) 16 and further receives background control information 13 transmitted from the image encoding apparatus 100. The background image generator 220 may have a configuration identical or similar to that of background image generator 120. The background image 16 is the same as (common to) the background image 11 used by the image encoding apparatus 100. The background image generator 220 generates a background image 17 based on the background control information 13 and the fundamental image 16. The background image generator 220 supplies the background image 17 to the image decoder 210.

As described above, in the image transmission system of the first embodiment, the image encoding apparatus generates background control information based on the input image and transmits it to the image decoding apparatus. In addition, the image encoding apparatus generates a background image based on this background control information and a fundamental image prepared beforehand, encodes this input image using the background image, and transmits the encoded data to the image decoding apparatus. The image decoding apparatus generates a background image (which is the same image as used by the image encoding apparatus) by using the transmitted background control information and the fundamental image (which is the same image as used by the image encoding apparatus), and decodes the encoded data using the background image. Accordingly, the image transmission system of the embodiment does not have to encode or transmit most of the background region included in the input image, and therefore significantly reduces the amount of data encoded. That is, images of high quality can be transmitted even if the bandwidth of a channel is narrow.

(Second Embodiment)

Figure 6:
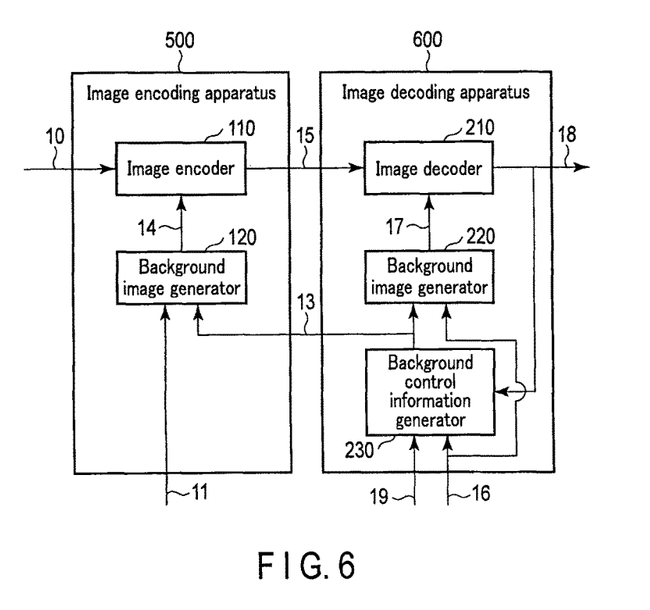
FIG. 6 is a block diagram illustrating an image transmission system according to the second embodiment.

As shown in FIG. 6, the image transmission system of the second embodiment comprises an image encoding apparatus 500 and an image decoding apparatus 600. The image encoding apparatus 500 includes an image encoder 110 and a background image generator 120. The image decoding apparatus 600 includes an image decoder 210, a background image generator 220 and a background control information generator 230. The image transmission system shown in FIG. 6 may be, for example, a system that transmits images photographed by a monitor camera to a remote operator terminal.

The image encoder 110 shown in FIG. 6 differs from the image encoder 110 shown in FIG. 1 in that it transmits encoded data 15 to the image decoding apparatus 600. The encoded data 15 may be transmitted to the image decoding apparatus 600 by wireless communications or supplied thereto by wire communications; alternatively, the encoded data 13 may be transferred to the image decoding apparatus 600, using a recording medium. The background image generator 120 shown in FIG. 6 differs from the background image generator 120 in that it receives background control information 13 transmitted from the image decoding apparatus 600.

The image decoder 210 shown in FIG. 6 differs from the image decoder 210 shown in FIG. 1 in that it receives encoded data 15 transmitted from the image decoding apparatus 500. The image decoder 210 supplies the reproduced image 18 not only to an external apparatus (e.g., a display not shown) but also to the background control information generator 230. The background image generator 220 shown in FIG. 6 differs from the background image generator 220 shown in FIG. 1 in that it receives background control information 13 transmitted from the background control information generator 230.

The background control information generator 230 receives a fundamental image 16 and supplemental information 19, and receives reproduced image 18 from the image decoder 210. The background control information generator 230 searches the fundamental image 16 for an image similar to the reproduced image 18, based for example on the supplemental information 19, and generates background control information 13 including selection information representing the image searched for (which image is the same as the selection image selected as the base of the background image 17). Furthermore, the background control information generator 230 may generate a correction parameter used for correcting the background image 17 and include it in the background control information 13.

In summary, the selection information described in relation to the first embodiment represents a selection image that is similar to the input image 10 to be encoded, while the selection information described in relation to the second embodiment represents a selection image that is similar to an reproduced image 18 (not the input image 10 to be encoded) reproduced by decoding a previously-encoded input image. Therefore, the second embodiment is suitably applied to the case where the background region included in the input image 10 does not undergo a significant temporal change.

The supplemental information 19 may include information representing, for example, a photographing position, a photographing direction, a photographing date, a photographing time, etc. These kinds of information are useful when the background control information generator 230 searches the fundamental image 16 for an image similar to the reproduced image 18. For example, the information on the photographing position and photographing direction is useful when the fundamental image 16 is searched for an image which is similar to the reproduced image 10 in terms of an object (especially, a background) to be photographed. The information on the photographing date and time is useful when the fundamental image 16 is searched for an image which is similar to the reproduced image 18 in terms of the sunshine condition.

The background control information generator 230 may search the fundamental image 16 for an image similar to the reproduced image 18, without using the supplemental information 19. Alternatively, the background control information generator 230 may select at least one image from the fundamental image 16, without reference to the reproduced image 18. In order to improve the coding rate, an image similar to the reproduced image 18 should be preferably searched for. In order to improve the search efficiency, the supplemental information 19 should be preferably used.

The background control information generator 230 supplies the background control information 13 to the background image generator 220. In addition, the background control information generator 230 supplies the background control information 13 to the image encoding apparatus 500. The background control information 13 may be transmitted to the image encoding apparatus 500 by wireless communications or supplied thereto by wire communications; alternatively, the background control information 13 may be transferred to the image encoding apparatus 500, using a recording medium.

Figure 7:
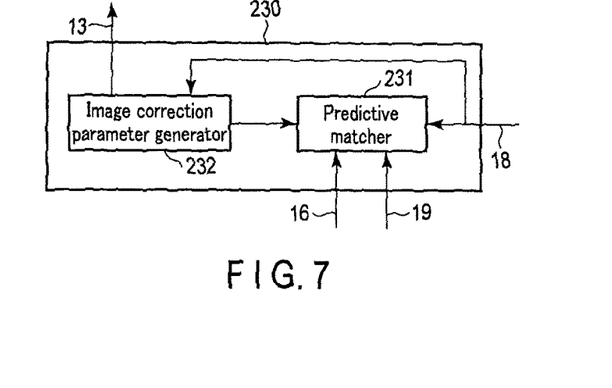
FIG. 7 is a block diagram illustrating a background control information generator depicted in FIG. 6.

FIG. 7 shows a specific example of the background control information generator 230. The background control information generator 230 shown in FIG. 7 includes a predictive matcher 231 and an image correction parameter generator 232.

The predictive matcher 231 receives a fundamental image 16 and supplemental information 19, and receives reproduced image 18 from the image decoder 210. The predictive matcher 231 searches the fundamental image 16 for an image similar to the reproduced image 18, based on the supplemental information 19, and generates selection information representing at least one image searched for (which image is the same as the selection image described above). The selection image may comprise, for example, an image which is included in the fundamental image 16 and which most resembles the reproduced image 18. The predictive matcher 231 supplies the selection information and the selection image to the image correction parameter generator 232.

The image correction parameter generator 232 receives the reproduced image 18 from the image decoder 210, and also receives the selection information and selection image from the predictive matcher 231. The image correction parameter generator 232 generates the correction parameter described above, based on the reproduced image 18 and the selection image. The image correction parameter generator 232 generates background control information 13, including selection information and a correction parameter, and supplies the generated background control information 13 to the background image generator 220. In addition, the image correction parameter generator 232 supplies the background control information 13 to the image encoding apparatus 500.

As described above, in the image transmission system of the second embodiment, the image decoding apparatus generates background control information based on the decoded reproduced image and transmits it to the image encoding apparatus. In addition, the image encoding apparatus generates a background image based on transmitted background control information and a fundamental image prepared beforehand, encodes the input image using the background image, and transmits the encoded data to the image decoding apparatus. The image decoding apparatus generates a background image (which is the same image as used by the image encoding apparatus), based on the generated background control information and the fundamental image (which is the same image as used by the image encoding apparatus), and decodes the encoded data using the background image. Accordingly, the image transmission system of the embodiment does not have to encode or transmit most of the background region included in the input image, and therefore significantly reduces the amount of data encoded. That is, images of high quality can be transmitted even if the bandwidth of a channel is narrow.

(Third Embodiment)

Figure 8:
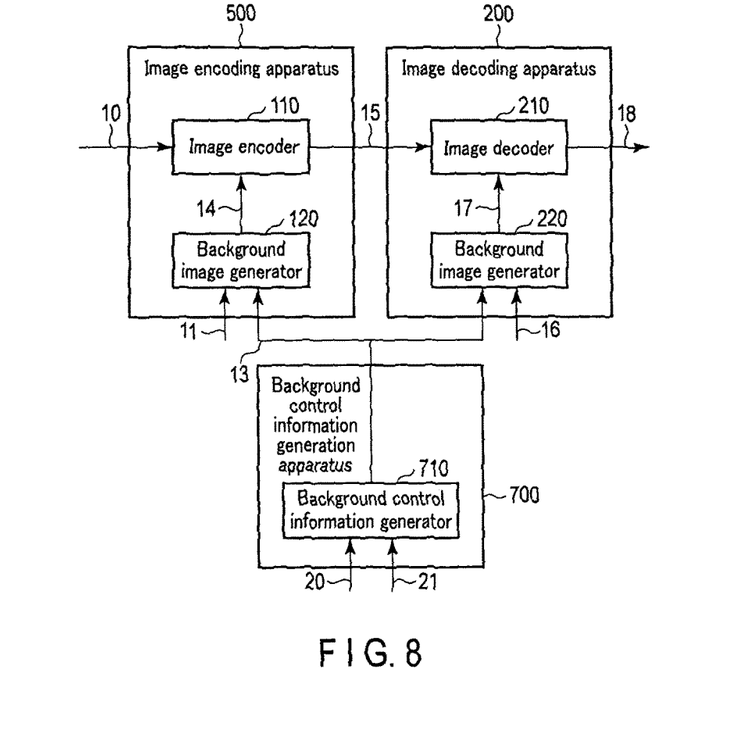
FIG. 8 is a block diagram illustrating an image transmission system according to the third embodiment.

As shown in FIG. 8, the image transmission system of the third embodiment comprises an image encoding apparatus 500, an image decoding apparatus 200 and a background control information generation apparatus 700. The background control information generation apparatus 700 includes a background control information generator 710. The image transmission system shown in FIG. 8 may be, for example, a system that transmits images photographed by a monitor camera to a remote operator terminal.

The background image generator 120 shown in FIG. 8 differs from the background image generator 120 in that it receives background control information 13 transmitted from the background control information generation apparatus 700. The background image generator 220 shown in FIG. 8 differs from the background image generator 220 shown in FIG. 1 in that it receives background control information 13 transmitted from the background control information generation apparatus 700.

The background control information generator 710 receives a fundamental image 20 and supplemental information 21. The background control information generator 710 searches the fundamental image 20 and selects at least one image based on the supplemental information 21, and generates background control information 13 including selection information representing the selected image. The fundamental image 20 is the same as (common to) the fundamental image 11 used by the image encoding apparatus 500 or the fundamental image 16 used by the image decoding apparatus 200. The supplemental information 21 may be the same as or similar to the aforementioned supplemental information 12 or the aforementioned supplemental information 19.

In addition, the background control information generator 710 supplies the background control information 13 to the image encoding apparatus 500 and the image decoding apparatus 200. The background control information 13 may be transmitted to the image encoding apparatus 500 and the image decoding apparatus 200 by wireless communications or supplied thereto by wire communications; alternatively, the background control information 13 may be transferred to the image encoding apparatus 500 and the image decoding apparatus 200, using a recording medium.

Figure 9:
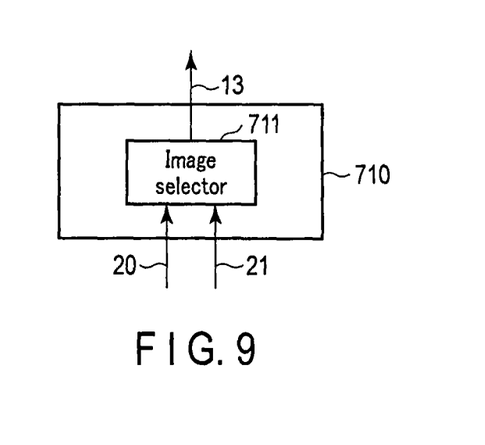
FIG. 9 is a block diagram illustrating a background control information generator depicted in FIG. 8.

The background control information generator 710 may be designed in the manner shown in FIG. 9. The background control information generator 710 shown in FIG. 9 includes an image selector 711. The image selector 711 receives a fundamental image 20 and supplemental information 21. The image selector 711 searches the fundamental image 20 and selects at least one image based on the supplemental information 21, and generates background control information 13 including selection information representing the selected image. The image selector 711 supplies the background control information 13 to the image encoding apparatus 500 and the image decoding apparatus 200.

As described above, in the image transmission system of the third embodiment, the background control information generation apparatus generates background control information and transmits it to the image encoding apparatus and the image decoding apparatus. In addition, the image encoding apparatus generates a background image based on transmitted background control information and a fundamental image prepared beforehand, encodes the input image using the background image, and transmits the encoded data to the image decoding apparatus. The image decoding apparatus generates a background image (which is the same image as used by the image encoding apparatus) by using the transmitted background control information and the fundamental image (which is the same image as used by the image encoding apparatus), and decodes the encoded data using the background image. Accordingly, the image transmission system of the embodiment does not have to encode or transmit most of the background region included in the input image, and therefore significantly reduces the amount of data encoded. That is, images of high quality can be transmitted even if the bandwidth of a channel is narrow.

(Fourth Embodiment)

Figure 10:
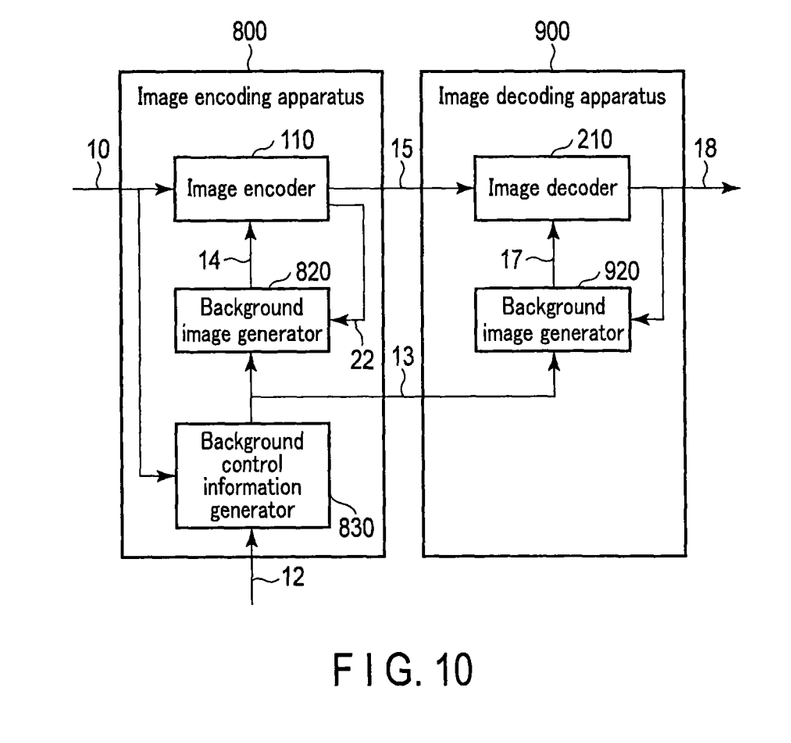
FIG. 10 is a block diagram illustrating an image transmission system according to the fourth embodiment.

As shown in FIG. 10, the image transmission system of the fourth embodiment comprises an image encoding apparatus 800 and an image decoding apparatus 900. The image encoding apparatus 800 includes an image encoder 110, a background image generator 820 and a background control information generator 830. The image decoding apparatus 900 includes an image decoder 210 and a background image generator 920. The image transmission system shown in FIG. 10 may be, for example, a system that transmits images photographed by a monitor camera to a remote operator terminal.

The image encoder 110 shown in FIG. 10 differs from the image encoders 110 shown in FIGS. 1, 6 and 8 in that it receives background image 14 from the background image generator 820 and in that it transmits encoded data 15 to the image decoding apparatus 900. In addition, the image encoder 110 supplies the reproduced image (signal) 22 to the background image generator 820. The reproduced image 22 may be either a local decoded image or an image obtained by executing some kind of image processing (e.g., filtering processing) for the local decoded image.

The image decoder 210 shown in FIG. 10 differs from the image decoders 210 shown in FIGS. 1, 6 and 8 in that it receives background image 17 from the background image generator 920 and in that it receives encoded data 15 transmitted from the image encoding apparatus 800. In addition, the image decoder 210 supplies the reproduced image 18 not only to an external apparatus (e.g., a display not shown) but also to the background image generator 920.

The background image generator 820 receives a reproduced image 22 from the image encoder 110, and also receives background control information 13 from the background control information generator 830. The background image generator 820 generates a background image 14 based on the background control information 13 and the reproduced image 22. The background image generator 820 supplies the background image 14 to the image encoder 110. That is, the background image generator 820 generates a background image 14, using the reproduced image 22 in place of the fundamental image 11 described above.

As described above, the background control information 13 includes a parameter required for generating the background image 14. To be specific, the background control information 13 shown in FIG. 10 may include selection information representing at least one image (selection image) that is selected as the base of the background image 14 of at least one reproduced image 22. The selection information may be a frame number if the reproduced image 22 is a moving picture. The background control information 13 includes a correction parameter used for enhancing the quality of the background image 14. The background image generator 820 may be designed in such a manner that the background control information 13 does not include selection information. For example, the background image generator 820 may be designed to automatically select a predetermined number of recently reproduced images.

For example, the background image generator 820 may generate the background image 14 by selecting one image (selection image) from at least one reproduced image 22. Alternatively, the background image generator 820 may generate the background image 14 by selecting a plurality of images (selection images) from a plurality of reproduced images 22 and executing background pixel calculation (to be described later), using the selection images. In addition, the background image generator 820 may execute format conversion or image correction for the background image 14 generated as above, before the background image 14 is supplied to the image encoder 110.

If the background image 14 differs from the input image 10 in format, then the background image generator 820 converts the format of the background image 14 to the same format as the input image 10. The format is, for example, an image size, an image bit depth, a color difference format, a color space, etc.

Where the background control information 13 includes a correction parameter, the background image generator 820 corrects the background image 14 using the correction parameter. To be more specific, the background image generator 820 may execute gamma correction, using the gamma value included in the correction parameter. The background image generator 820 may execute histogram conversion, using the histogram information on the input image included in the correction parameter. The background image generator 820 may execute Wiener filter processing for the background image 14, using the filter coefficient of the Wiener filter included in the correction parameter (the filter coefficient can be determined based on the input image 10 and the background image 14). The background image generator 820 may execute weighted prediction of the background image 14, for example, for the correction of the brightness, using the weight coefficient and offset value included in the correction parameter. The background image generator 820 may execute geometric transform of the background image 14, for example, for the correction of the photographing position, using the geometric-transform parameter value included in the correction parameter. The background image generator 820 may execute a variety of image corrections not mentioned herein.

Figure 11:
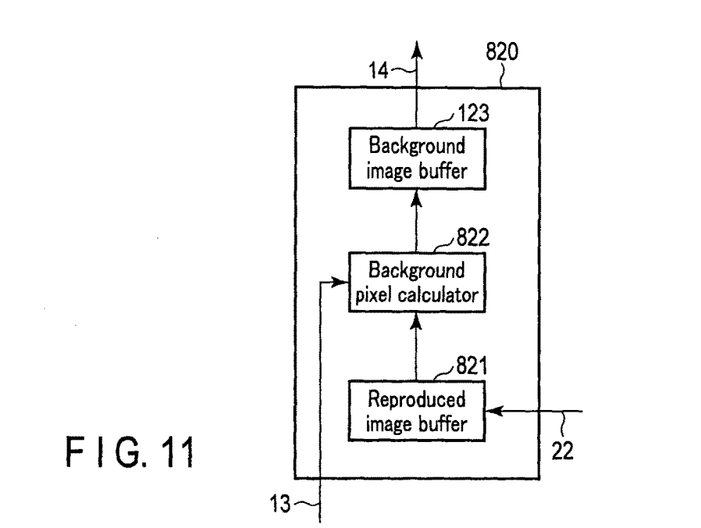
FIG. 11 is a block diagram illustrating a background image generator depicted in FIG. 10.

FIG. 11 shows a specific example of the background image generator 820. The background image generator 820 shown in FIG. 11 includes a reproduced image buffer 821, a background pixel calculator 822 and a background image buffer 123. The background image generator 123 shown in FIG. 11 differs from the background image generator 123 shown in FIG. 2 in that it receives a background image 14 supplied from the background pixel calculator 822.

The reproduced image buffer 821 receives a reproduced image 22 from the image encoder 110 and stores it therein. The reproduced image 22 stored in the reproduced image buffer 821 is read out by the background pixel calculator 822, as needed.

The background pixel calculator 822 receives background control information 13 from the background control information generator 830. The background pixel calculator 822 selects a plurality of images from a plurality of reproduced images 22 and reads the selected images from the reproduced image buffer 821. The background pixel calculator 822 generates a background image 14 (pixel values constituting the background image 14) by executing background pixel calculation using the selection images read out from the reproduced image buffer 821. The background pixel calculator 822 supplies the background image 14 to the background image buffer 123.

The background pixel calculation may be any kind of arithmetic processing as long as background pixels can be derived from a plurality of images (selection images) that are adjusted in position and photographed at different photographing times. For example, the background pixel calculator 822 may calculate a mode of the pixel values at predetermined positions of the selection images, thereby deriving the pixel values of the predetermined position of the background image 14. The background pixel calculator 822 may calculate a median or an average in place of the mode. The background pixel calculator 822 may determine a threshold used for determining non-background pixels (foreground pixels), based on the average and variance of the pixel values at predetermined positions of a plurality of selection values. In this case, the background pixel calculator 122 first excludes non-background pixels from the pixel values, and re-calculates an average to derive the pixel values at the predetermined position of the background image 14. Alternatively, the background pixel calculator 822 may calculate each of the pixel values of the background image 14, using the Gaussian mixture model (GMM) or the Godbehere, Matsukawa, Goldberg algorithm (GMG algorithm). The background pixel calculator 822 may calculate each of the pixel values of the background image 14, using various encoding parameters regarding the reproduced image 22 (e.g., skipping information for motion compensation, or an absolute value sum of prediction errors).

A general image transmission system uses a color space in which a pixel value is expressed based on one brightness signal and two color-difference signals. However, the brightness signal is easily affected by a shadow in the background pixel calculation. If the color space of a selection image includes a brightness signal, therefore, the background pixel calculator 822 may first convert the color space into a color space including no brightness signal (e.g., RGB) and then execute background pixel calculation. Furthermore, the background pixel calculator 822 may change each pixel value of the background image 14 back into an original color space, as needed.

The background control information generator 830 receives an input image 10 and supplemental information 12. For example, the background control information generator 830 checks the reproduced image 22 and predicts an image which is very likely to resemble the input image 10, based on the supplemental information 12, and generates background control information 13 including selection information representing the predicted image (which image is the same as the selection image described above). Furthermore, the background control information generator 830 may generate a correction parameter used for correcting the background image 14 and include it in the background control information 13.

The background control information generator 830 may check the reproduced image 22 and predict an image which is very likely to resemble the input image, without using the supplemental information 12. Alternatively, the background control information generator 830 may select at least one image from the reproduced image 22, without reference to the input image 10. In order to improve the coding rate, an image similar to the input image 10 should be preferably predicted. In order to improve the prediction efficiency, the supplemental information 12 should be preferably used.

The background control information generator 830 supplies the background control information 13 to the background image generator 820. In addition, the background control information generator 830 supplies the background control information 13 to the image decoding apparatus 900. The background control information 13 may be transmitted to the image decoding apparatus 900 by wireless communications or supplied thereto by wire communications; alternatively, the background control information 13 may be transferred to the image decoding apparatus 900, using a recording medium.

The background control information 13 may be transmitted separately from the encoded data 15 or together with the encoded data 15. For example, the background control information 13 and the encoded data 15 are transmitted after being multiplexed or packetized. For the transmission of the background control information 13, a framework of the SEI in H.264/AVC or H.265/HEVC may be used.

Figure 12:
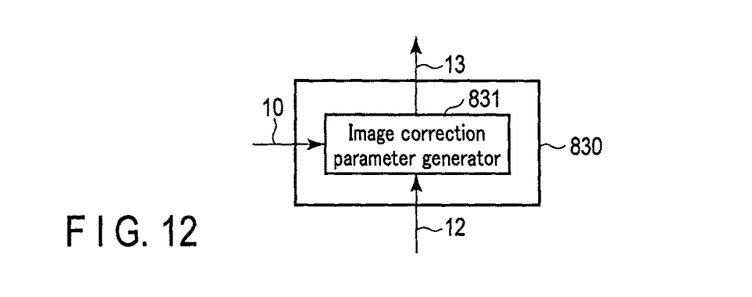
FIG. 12 is a block diagram illustrating a background control information generator depicted in FIG. 10.

FIG. 12 shows a specific example of the background control information generator 830. The background control information generator 830 shown in FIG. 12 includes an image correction parameter generator 831.

The image correction parameter generator 831 receives an input image 10 and supplemental information 12. The image correction parameter generator 831 generates the correction parameter described above, based on the input image 10 and the supplemental information 12. The image correction parameter generator 831 generates background control information 13, including a correction parameter, and supplies the generated background control information 13 to the background image generator 820. In addition, the image correction parameter generator 831 supplies the background control information 13 to the image decoding apparatus 900.

The background image generator 920 receives a reproduced image 18 and further receives background control information 13 transmitted from the image encoding apparatus 800. The background image generator 920 may have a configuration identical or similar to that of background image generator 820. The reproduced image 18 is the same as the reproduced image 22 used by the image encoding apparatus 800. The background image generator 920 generates a background image 17 based on the background control information 13 and the reproduced image 18. The background image generator 920 supplies the background image 17 to the image decoder 210. In summary, the background image generator 920 generates a background image 17, using the reproduced image 18 in place of the fundamental image 16 described above.

As described above, in the image transmission system of the fourth embodiment, the image encoding apparatus generates background control information based on the input image and transmits it to the image decoding apparatus. In addition, the image encoding apparatus generates a background image based on this background control information and a reproduced image corresponding to the local decoded image of the encoded input image, encodes this input image using the background image, and transmits the encoded data to the image decoding apparatus. The image decoding apparatus generates a background image (which is the same image as used by the image encoding apparatus) using both the transmitted background control information and the decoded reproduced image, and decodes the encoded data using the background image. Accordingly, the image transmission system of the embodiment does not have to encode or transmit most of the background region included in the input image, and therefore significantly reduces the amount of data encoded. That is, images of high quality can be transmitted even if the bandwidth of a channel is narrow.

Figure 13:
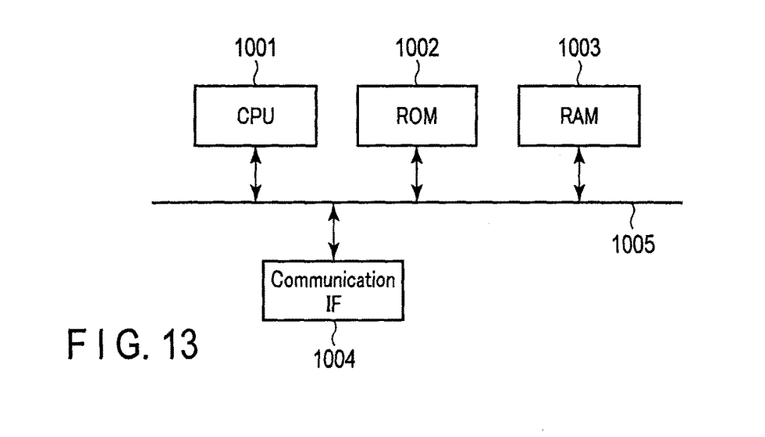
FIG. 13 illustrates an example of hardware that realizes the image encoding apparatus, image decoding apparatus and background control information generation apparatus included in the image transmission system according to each embodiment.

The image encoding apparatus, image decoding apparatus and background control information generation apparatus included in the image transmission system of each embodiment may be implemented by the hardware components shown in FIG. 13. The hardware components shown in FIG. 13 include a central processing unit (CPU) 1001, a read only memory (ROM) 1002, a random access memory (RAM) 1003, a communication interface (IF) 1004 and a bus 1005.

Data is exchanged between the CPU 1001, ROM 1002, RAM 1003 and communication IF 1004 through the bus 1005.

The CPU 1001 reads a program from a recording medium (e.g., ROM 1002) and stores it in the main memory. By executing the program, the CPU 1001 operates as functional units for performing the operations described above (e.g., as a predicted image generator 308). The RAM 1003 may be used as various buffers described above. The communication IF 1004 may be used for transmitting/receiving the background control information 13, encoded data 15, etc.

At least a part of the processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image decoding apparatus comprising: a background control information generator that generates background control information based on a first reproduced image which is previously decoded, the background control information used for generating a first background image from first fundamental images prepared beforehand:
   a background image generator that generates the first background image, based on the background control information and the first fundamental images; and an image decoder that decodes first encoded data using the first background image to generate a second reproduced image, wherein the background control information includes selection information representing an image selected for generating the first background image from the first fundamental images, the background control information generator searches the first fundamental images for an image that most resembles the first reproduced image and generates background control information including the selection information that represents the image searched for, and the first reproduced image is generated by decoding second encoded data having a decoding order earlier than that of the first encoded data, wherein the background control information generator searches the first fundamental images for the image that most resembles the first reproduced image, based on supplemental information.

2. The apparatus according to claim 1, wherein the background control information generator transmits the background information to an image encoding apparatus that generates the first encoded data.

3. The apparatus according to claim 1, wherein the supplemental information includes information representing at least one of a photographing date, a photographing time, a photographing position, or a photographing direction.

4. The apparatus according to claim 1, wherein the first encoded data is generated by encoding an image photographed by a camera attached to a first moving object when the first moving object travels along a predetermined route, and the first fundamental images are past images which are photographed by a camera attached to a second moving object when the second moving object travels along the route.

5. The apparatus according to claim 1, wherein the background control information includes a correction parameter used for correcting the first background image.

6. The apparatus according to claim 1, wherein the image decoder generates the second reproduced image by decoding the first encoded data, using at least one reference image including the first background image.

7. An image encoding apparatus comprising:
   a background image generator that generates a second background image which is the same as the first background image, based on the background control information and second fundamental images, wherein the background control information is transmitted from the image decoding apparatus according to claim 2 and the second fundamental images are the same as the first fundamental images; and
   an image encoder that encodes an input image using the second background image to generate the first encoded data.

8. An image decoding method comprising: generating background control information based on a first reproduced image which is previously decoded, the background control information used for generating a first background image from first fundamental images prepared beforehand: generating the first background image, based on the background control information and the first fundamental images; and decoding first encoded data using the first background image to generate a second reproduced image, wherein the background control information includes selection information representing an image selected for generating the first background image from the first fundamental images, the background control information generator searches the first fundamental images for an image that most resembles the first reproduced image and generates background control information including the selection information that represents the image searched for, and the first reproduced image is generated by decoding second encoded data having a decoding order earlier than that of the first encoded data, wherein the background control information generator searches the first fundamental images for the image that most resembles the first reproduced image, based on supplemental information.

* * * * *